July 18, 1950     R. H. ARBIB     2,515,391
BUMPER GUARD AND EXHAUST EXTENSION
Filed March 30, 1948     2 Sheets-Sheet 1
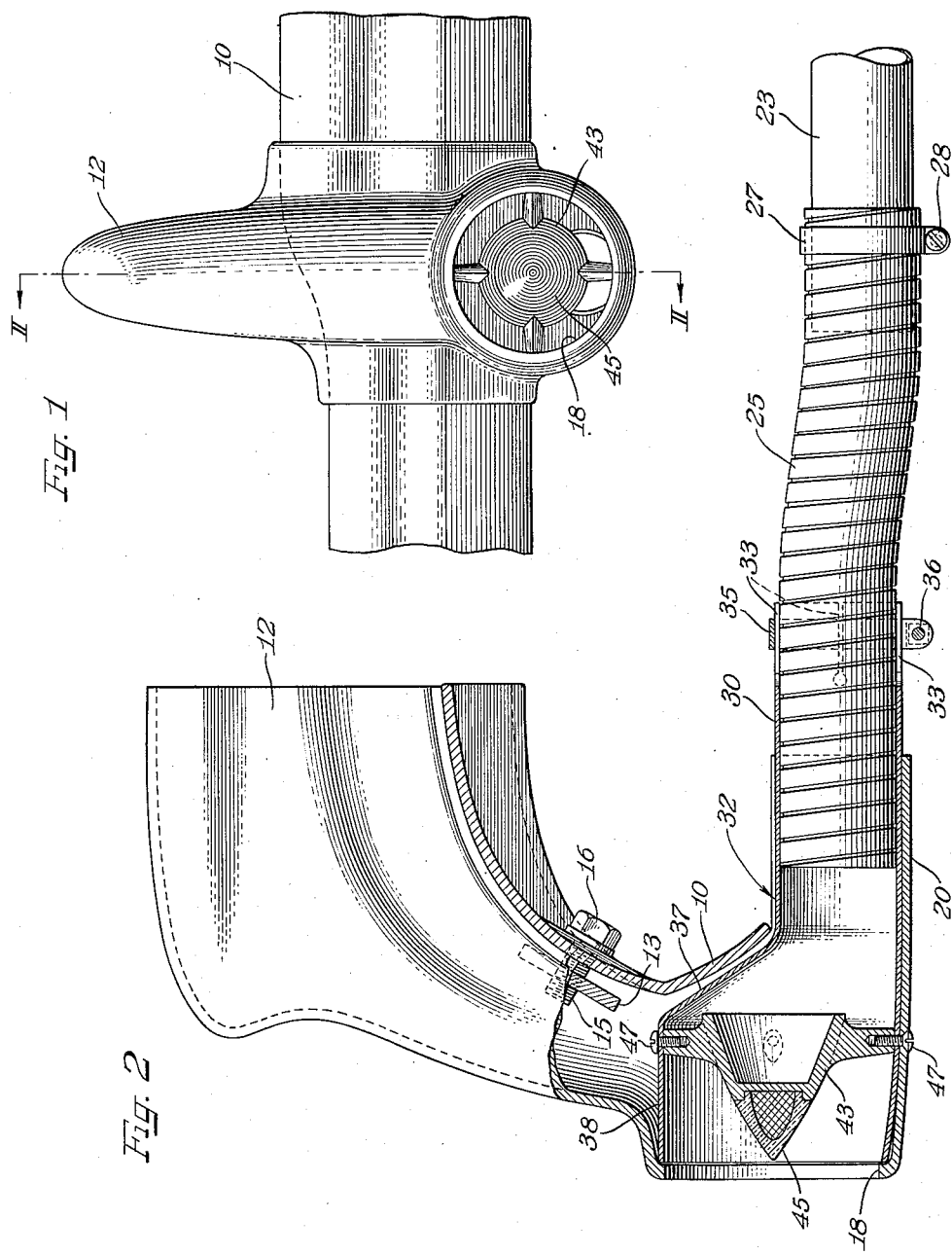
Inventor
Richard H. Arbib
by     Attys

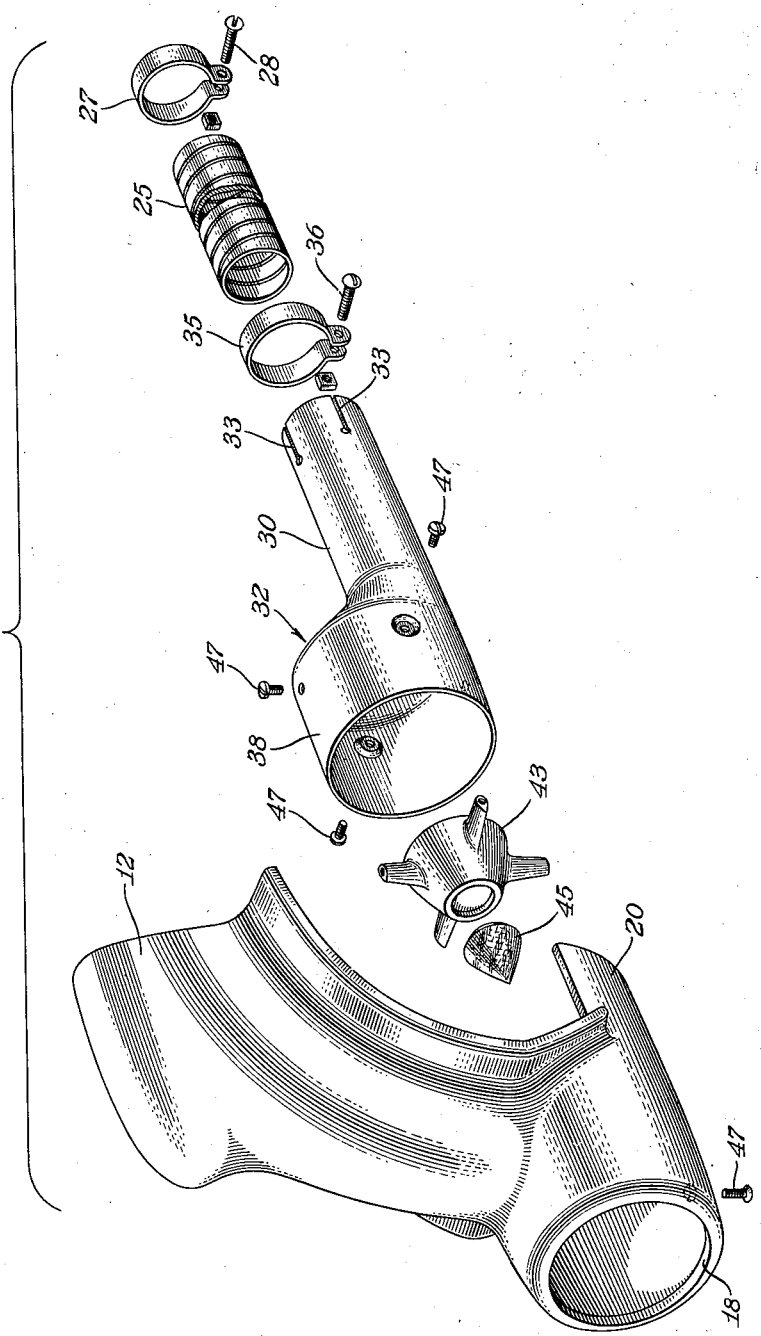

Patented July 18, 1950

2,515,391

UNITED STATES PATENT OFFICE 2,515,391

BUMPER GUARD AND EXHAUST EXTENSION

Richard H. Arbib, Grosse Pointe Woods, Mich., assignor to Houdaille-Hershey Corporation, Detroit, Mich., a corporation of Michigan Application March 30, 1948, Serial No. 17,821

8 Claims. (Cl. 293—69)

This invention relates to automotive accessories and more particularly to a rear bumper for use on automobiles.

It has heretofore been the practice in automobile construction to have the exhaust of the automobile terminate in an open pipe adjacent the rear bumper. This construction usually resulted in the gases from the exhaust flowing upwardly around the bumper and discoloring the chrome finish thereof. Such a construction also necessitated having a special bracket on the rear end of the car to hold the end of the exhaust pipe or the use of a long unsupported cantilever pipe projecting from the rear of the car.

It is an object of the present invention to provide a bumper having a bumper guard which will support the exhaust pipe.

It is another object of the invention to prevent disfigurement of the bumper from the exhaust gases.

A further object of the invention is to provide a bumper and bumper guard which will be attractive and which may be readily manufactured.

A still further object is to provide a support for the discharge end of the exhaust pipe which will be strong and rigid.

Still further objects will become apparent when considering the following specification which when taken in connection with the accompanying drawings, illustrate a preferred form of the invention.

In the drawings:

Figure 1 is an elevational view looking at a bumper of an automobile or the like, and showing the discharge end of an exhaust pipe together with the bumper and the bumper guard.

Figure 2 is a side elevational view of the bumper guard and exhaust pipe, parts thereof being broken away to more clearly illustrate certain other parts, and Figure 3 is an exploded view of the bumper guard and exhaust pipe.

Referring to the drawings, an automobile (not shown) is provided with a bumper 10 which may be attached between the side chassis members (not shown) of the automobile and extend therebeyond to protect the wheels. The bumper has a guard 12 formed with a rib 13 transversely thereacross. The rib is provided with a threaded hole which receives a screw 15 having a head 16 on one end thereof, the screw 15 passing through the bumper 10 to hold the bumper guard assembled thereon.

The guard 12 is made hollow in the usual manner, and is provided with a circular aperture 18 at the rear end thereof, the aperture teminating in a horizontal semi-cylindrical apron 20, which runs forwardly towards the engine.

An exhaust pipe 23 leads from the exhaust manifold of the engine (not shown) to the rear of the car and has a flexible tubing 25 attached to the end thereof by a clamp 27. A screw 28 tightens the clamp on the exhaust pipe.

The flexible tubing 25 is received in a cylindrical end 30 of an exhaust nipple, generally designated 32. The exhaust nipple has a plurality of slots 33 therein over which a clamp 35 is adapted to fit. A screw 36 draws the clamp tightly around the outer end of the cylindrical portion 30 of the nipple 32 to clamp the flexible exhaust pipe in the nipple 32.

The cylindrical end 30 of the exhaust nipple 32 bells upwardly as shown at 37 into a larger diameter 38 which corresponds with the opening 18 in the bumper guard.

The portion 38 of the nipple 32 has a diffuser 43 mounted therein which has a reflector light 45 in the outer end thereof to warn approaching cars.

The diffuser 43 is attached in the interior of the section 38 by a plurality of screws 47, one of which also passes through the apron 20 to simultaneously secure the diffuser in the nipple 32 and to secure the nipple 32 in the bumper guard with the exhaust end thereof in alignment with the opening 18.

In the event of loss of the screw 47 securing the nipple 32 in the bumper 12, it will be noted that the bell section 37 would then be retained in the proper position by the bumper 10.

It will thus be seen that there has been provided a bumper guard which supports the rear end of the exhaust pipe to permit gases to pass through the bumper guard and be discharged free and clear of the bumper thus avoiding marring of the bumper and the bumper guard, while, at the same time, providing a strong and rigid support for the end of the exhaust pipe.

It will be realized that the heretofore described form of the invention is to be taken merely as a preferred embodiment thereof and that various changes in size, shape and arrangement of parts may be made without departing from the spirit of the invention or the scope of the subjoined claims.

That which is claimed as new and is desired to be secured by United States Letters Patent is:

1. A bumper guard adapted for attachment to the rear bumper of an automobile, said bumper guard having an aperture therein to receive the outlet end of the exhaust pipe with the outlet end thereof projecting beyond the main portion of the bumper, and means to support said exhaust pipe in said guard with the outlet thereof aligned with said aperture.

2. A bumper guard adapted for attachment to the rear bumper of an automobile, said bumper guard having an aperture therein to receive the outlet end of an exhaust pipe with the outlet end thereof projecting beyond the main portion of the bumper, and a baffle in said exhaust pipe adjacent the outlet end thereof, and means to secure the exhaust pipe in the bumper guard with the outlet end thereof aligned with said aperture.

3. In a bumper guard and nipple assembly, a guard for attachment to the rear bumper of an automobile, an open ended housing formed integrally with said guard and an exhaust nipple mounted in said housing with its outlet end when assembled in place extending beyond the main portion of the bumper and its inlet end underlying said bumper for communication with an exhaust conduit of said automobile.

4. In a bumper guard and nipple assembly, a guard for attachment to the rear bumper of an automobile, an open ended housing formed integrally with said guard, an exhaust nipple mounted in said housing with its outlet end extending beyond the main portion of said bumper and its inlet end underlying said bumper for communication with the exhaust conduit of said automobile, and a baffle secured within the outlet end of said nipple to extend thereacross.

5. In a bumper guard and exhaust extension member assembly for attachment to an automobile bumper to convey exhaust gases from an exhaust pipe to a point beyond said bumper, an open ended housing formed integrally with said guard, an exhaust nipple mounted in said housing with its outlet end for extension beyond the main portion of said bumper and its inlet end to underlie said bumper, and a flexible metal hose having one end for attachment to the outlet end of said nipple and its other end for attachment to said exhaust pipe.

6. In a bumper guard and exhaust extension assembly for attachment to an automobile bumper to convey exhaust gases from an exhaust pipe to a point beyond said bumper, an open ended housing formed integrally with said guard, an exhaust nipple mounted in said housing with its outlet end for extension beyond the main portion of said bumper and its inlet end to underlie said bumper, a baffle secured within the outlet end of said nipple to extend thereacross, and a flexible metal hose having one end for attachment to the inlet end of said nipple and its other end for attachment to said exhaust pipe.

7. In a bumper guard and exhaust extension assembly for attachment to an automobile bumper to convey exhaust gases from an exhaust pipe to a point beyond said bumper, a housing having an enlarged outlet aperture and a reduced inlet aperture, an exhaust nipple having an enlarged outlet end for extension beyond the main portion of said bumper and in full communication with said housing outlet aperture, said nipple also having a reduced inlet end for extension through said housing inlet aperture to underlie said bumper for communication with said exhaust pipe.

8. In a bumper guard and exhaust extension assembly for attachment to an automobile bumper to convey exhaust gases from an exhaust pipe to a point beyond said bumper, a housing having an enlarged outlet aperture and a reduced inlet aperture, an exhaust nipple having an enlarged outlet end for extension beyond the main portion of said bumper and in full communication with said housing outlet aperture, said nipple having a reduced inlet end for extension through said housing inlet aperture to underlie said bumper for communication with said exhaust pipe, and a baffle secured within the enlarged outlet end of said nipple to extend radially thereacross.

RICHARD H. ARBIB.

REFERENCES CITED

The following references are of record in the file of this patent:

UNITED STATES PATENTS

| Number | Name | Date |
|---|---|---|
| 2,180,843 | Zand | Nov. 21, 1939 |
| 2,382,386 | Arms | Aug. 14, 1945 |
| 2,420,700 | Curphy | May 20, 1947 |